July 10, 1956 D. D. WILCOX, JR 2,754,059

ELECTRONIC DIFFERENTIAL DIGITAL COMPUTER

Filed Nov. 27, 1951

3 Sheets-Sheet 1

Dwight D. Wilcox, Jr.
INVENTOR

BY [signature]

ATTORNEYS

July 10, 1956 D. D. WILCOX, JR 2,754,059

ELECTRONIC DIFFERENTIAL DIGITAL COMPUTER

Filed Nov. 27, 1951

3 Sheets-Sheet 2

Dwight D. Wilcox, Jr.
INVENTOR.

BY [signature]

ATTORNEYS

Dwight D. Wilcox, Jr.
INVENTOR.
BY G. D. O'Brien
ATTORNEYS

United States Patent Office 2,754,059

Patented July 10, 1956

2,754,059

ELECTRONIC DIFFERENTIAL DIGITAL COMPUTER

Dwight D. Wilcox, Jr., Rochester, N. Y., assignor, by mesne assignments, to the United States of America as represented by the Secretary of the Navy Application November 27, 1951, Serial No. 258,371

4 Claims. (Cl. 235—92)

This invention relates generally to electronic digital computers and more particularly to electronic apparatus for computing the difference between the number of impulses received over a pair of channels.

The computer of the invention includes a binary counter adapted to be triggered in the forward direction by pulses over one channel and in the reverse direction by pulses over another channel and means to detect when the counter has reached any predetermined number within its range. The computer of the invention is not limited to use in a specific application, but is applicable to any situation where it is required automatically to add and subtract without external control.

The conventional basic circuit utilized in adapting the invention herein to the counter of the preferred embodiment of the invention is a version of a trigger circuit which is a form of relaxation oscillator and often referred to as a "bistable multivibrator" or as a "flip-flop" circuit. Generally, a flip-flop circuit is a triggered circuit having two stable limiting conditions into which the circuit is alternately triggered by a trigger pulse. In one of its simpler forms, this circuit includes two triodes in which the grid of the first triode is coupled to the anode of the second triode through a network consisting of a parallel connected resistor and capacitor, and the grid of the second triode is similarly coupled to the anode of the first triode through an identical coupling network. This basic circuit is bistable, i. e., it possesses two conditions of stable equilibrium. One condition exists when the first tube is conducting and the second is cut off; the second condition exists when the second tube is conducting and the first is cut off. The circuit remains in one or the other of these two conditions with no change in plate, grid, or cathode potentials, or plate current, until some action occurs which cuts off the conducting tube. The tubes then reverse their functions and remain in the new condition as long as plate current flows in the conducting tube. Other counter circuits utilizing crystal or neon diodes as well as other flip-flop circuits utilizing three electrode semiconductor amplifiers which are termed "transistors" are well known, and the appended claims are intended to cover all such modifications.

It is an object of the invention to provide an improved digital computer adapted to compute the differential between pulses received over a pair of channels. The word "differential" is used in the sense of a difference between two numbers rather than in the mathematical sense of an infinitesimal change assigned to a variable; i. e., a derivative. Another object of the invention is to provide an improved electronic computing device that can both add and subtract. A further object of the invention is to provide such an improved electronic computer that accomplishes summation by counting pulses forward on pulses over one input channel and backward on pulses over another channel. A still further object of the invention is to provide such a computer that utilizes a unique method of pulsing the counter one less than its capacity in order to accomplish the backward count, i. e., subtraction.

It is a particular object of the invention to provide an electronic counter operable either forwardly or reversely which does not require switching means between stages to select whether an addition or a subtraction operation is to be accomplished. It is a further object of the invention to provide an improved electronic counter in which it is unnecessary to utilize rectifiers or vacuum tubes between stages in order to trigger a succeeding stage only on every second alternation of the preceding stage thereby permitting capacitance coupling between the stages of the counter. It is a still further object of the invention to provide an improved plus-and-minus electronic computer in which it is unnecessary to change the coupling between stages in order to accomplish subtraction.

Still another object of the invention is to provide an improved electronic digital computer which is adapted to detect when the difference in the number of pulses received over each of a pair of input channels is a predetermined number and to give an actuation according to the polarity of said difference. A still further object is to provide unique and novel digit selecting means for predetermining when the computer has reached any desired count within its range. A further object is to provide improved means of clearing the counter after each such actuation in order to condition the computer for counting succeeding pulses. Another object of the invention is to provide such an electronic differential computer which requires only a minimum number of tubes and electronic components and has an extremely low power consumption.

In accomplishing the objects of the invention, a plurality or number, "$n$," of bistable stages, i. e., each stage being stable in two positions of equilibrium, are connected in cascade arrangement to provide a counter chain in which each digital place in the binary system of numeration is represented by a stage. Pulses over a first input channel are fed into the computer so as to have the cascaded stages count forward; means are provided to energize the cascaded stages to count forward $(2^n-1)$ times, i. e., back one count, when a pulse is received over the second input channel. If pulses are applied alternately to the two channels, the counter does not progress forward since the total of the two successive pulses returns the counter to its original position. If more pulses are received over one channel than over the other, the count will proceed forward or backward from zero depending upon which channel furnishes the most pulses. Digit selecting means controlled by the positions of equilibrium of the stages are utilized to detect when the difference between the number of signals sent over the channels is a predetermined number and to give an electrical actuation according to the polarity of said difference.

In the preferred embodiment of the invention, three stages of twin triodes are connected in a chain so that each pair of triodes is triggered from the stage immediately preceding it. Means are provided so that each triode of a stage can be triggered from a common source. The three stages of twin triodes have eight unique positions, i. e., the counter has a capacity of 8. One of the channels is coupled to the common source of the first stage in order to cause the counter to count forward; means are provided to cause the counter to count forward seven counts, i. e., back one count, when a pulse is received over the second channel. Change of one pulse into seven pulses to make the counter subtract is accomplished by gating an oscillator "on" for seven cycles. A phase-shift oscillator controlled by a one-shot, or monostable, multivibrator provides seven pulses of uniform time and duration when the multivibrator is triggered.

In the preferred embodiment of the invention, it is desired to provide an electrical actuation when a differential of 3 is accumulated. At counter positions 3 and 5 (—3) different arrangements of triodes are conducting. At position 3 the plate voltages of the three triodes that are conducting uniquely determine that position; similarly, the three conducting triodes of the six at position 5 uniquely determine that position. A common bus connects the grid of a first detecting tube to the anode electrodes of the three triodes whose conducting state uniquely determines counter position 3, and the detecting tube is biased so that it can conduct only when these three triodes are cut off. Similarly, the grid of a second detecting tube is connected by a common bus to the three anodes of the triodes whose conducting status uniquely determines position 5 (—3) of the counter. The word "detect" is used in the sense of to discover or learn the existence of something being looked for, rather than in the radio receiver sense of "to rectify." Relays in the plate circuits of the two detecting tubes provide an output pulse over the appropriate output channel when a differential of 3 is accumulated. Normally closed contacts on these relays are utilized to open the cathode circuits of the tubes in the triggering circuits to reset the counter to its original condition.

The invention will be described by reference to the accompanying drawing in which.

Figures 3, 4:
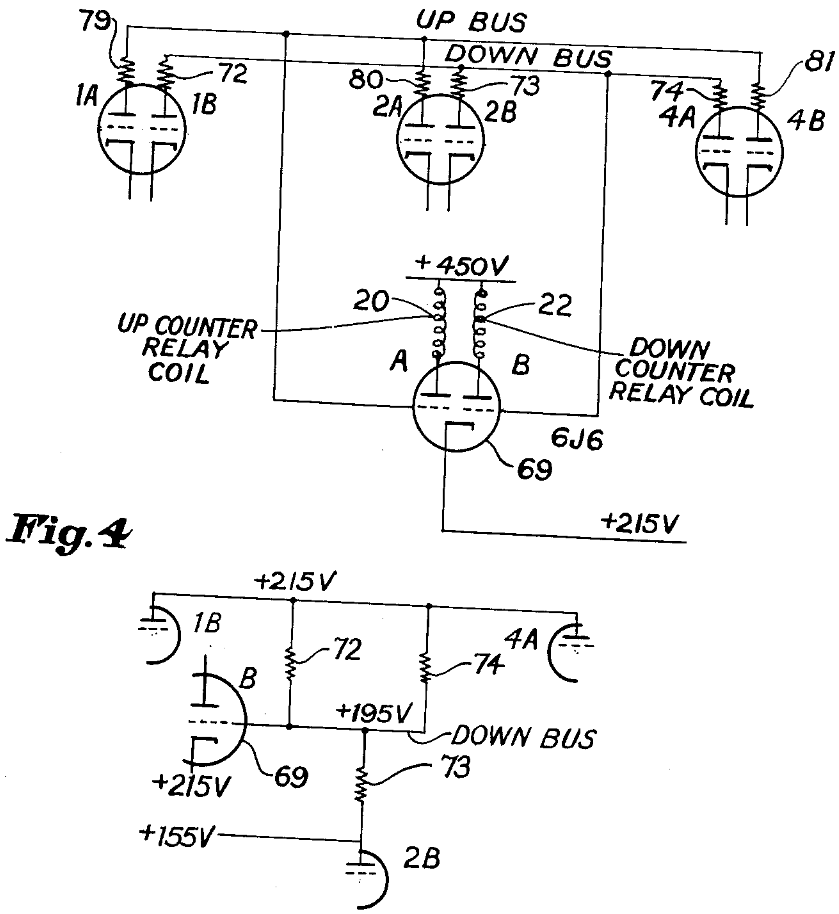
Fig. 3 is a simplified circuit diagram of the detecting portion of the circuit of Fig. 2.
Figure 5:
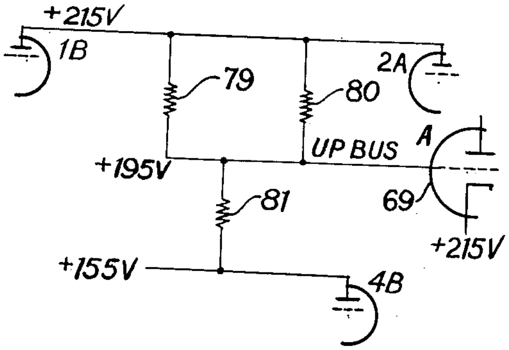

Fig. 4 is a schematic circuit diagram of the means for biasing the first detector tube to prevent its conduction except when the three applicable triodes which uniquely determine counter position 3 are cut off; and Fig. 5 is a schematic circuit diagram similar to Fig. 4 and illustrating the means for biasing the second detector tube to prevent its conduction unless the three applicable triodes which uniquely determine position 5 (—3) are cut off.

Figure 1:
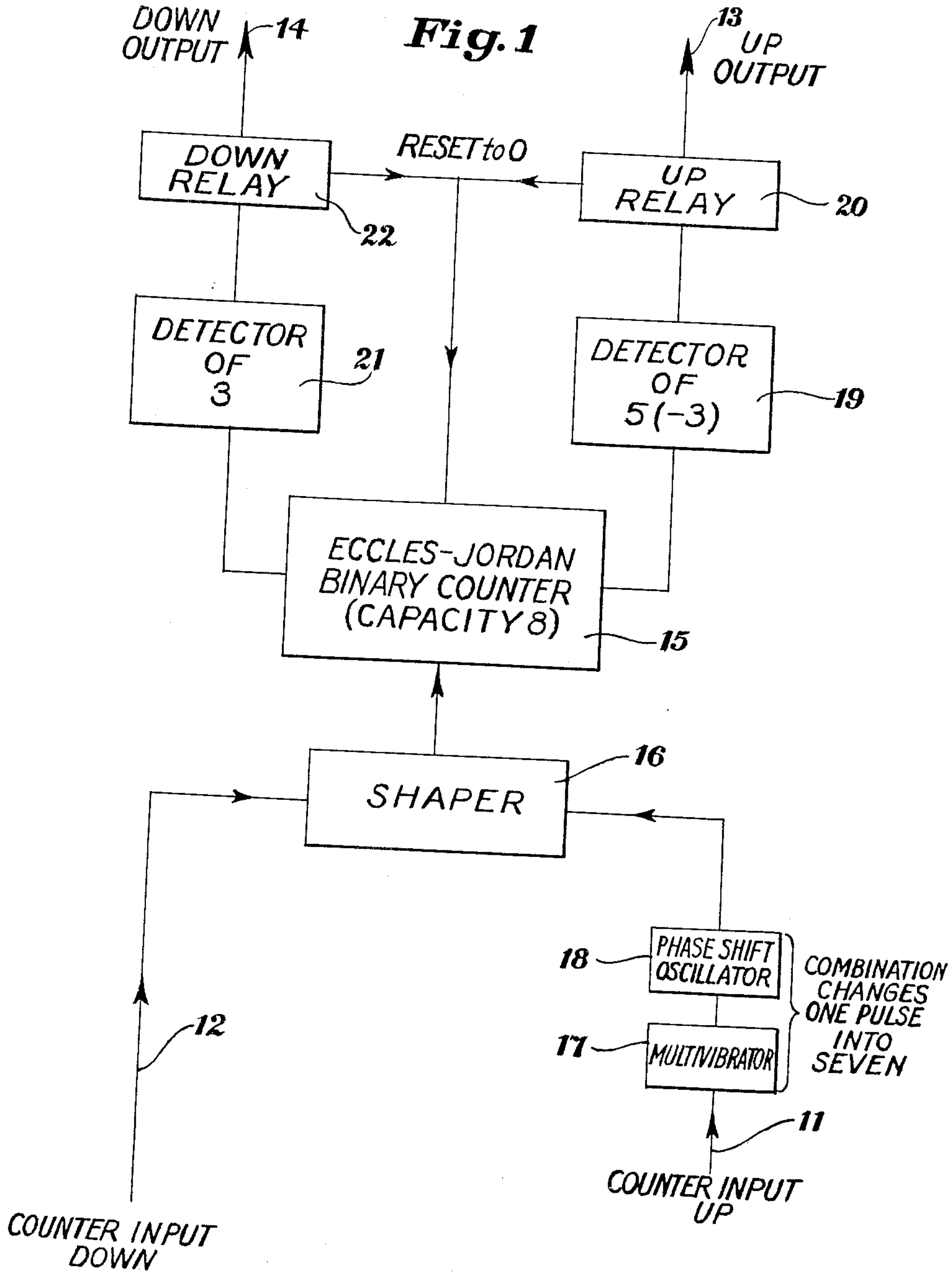
Fig. 1 is a block diagram schematically illustrating the operation of the preferred embodiment of the electronic differential computer of the invention.

As shown in the block diagram of Fig. 1, the preferred embodiment of the electronic differential digital computer of the invention is adapted to receive impulses over an Up input channel 11 and over a Down input channel 12, and to give an output pulse over an Up output channel 13 or over a Down output channel 14 when the difference between the number of impulses received over the input channels 11 and 12 is a predetermined number. A binary counter 15 comprising three cascaded circuits is triggered by the output of a shaper circuit 16 which is adapted to provide trigger pulses of the desired wave shape. Pulses over the Down input channel 12 are coupled directly to the shaper 16 and cause the binary counter 15 to count forward. Each pulse over the Up input lead 11 triggers a one-shot, or monostable, multivibrator 17 which in turn gates a phase-shift oscillator 18 "on" for a sufficient interval to deliver seven impulses to the shaper 16 and thus cause the binary counter 15 to count backward one position as explained in detail hereinafter. Up detecting means 19 operates an Up relay 20 to deliver an ampulse over the Up output channel 13 when the counter has counted backward three positions from zero, i. e., when (Up—Down=3). Similarly, Down detecting means 21 operate a Down relay 22 to deliver an output pulse over the Down output channel 14 when the binary counter 15 has counted forward three positions from zero, i. e., when (Down—Up=3). Operation of either the Up relay 20 or the Down relay 22 resets the binary counter 15 to the zero position.

Figure 2:
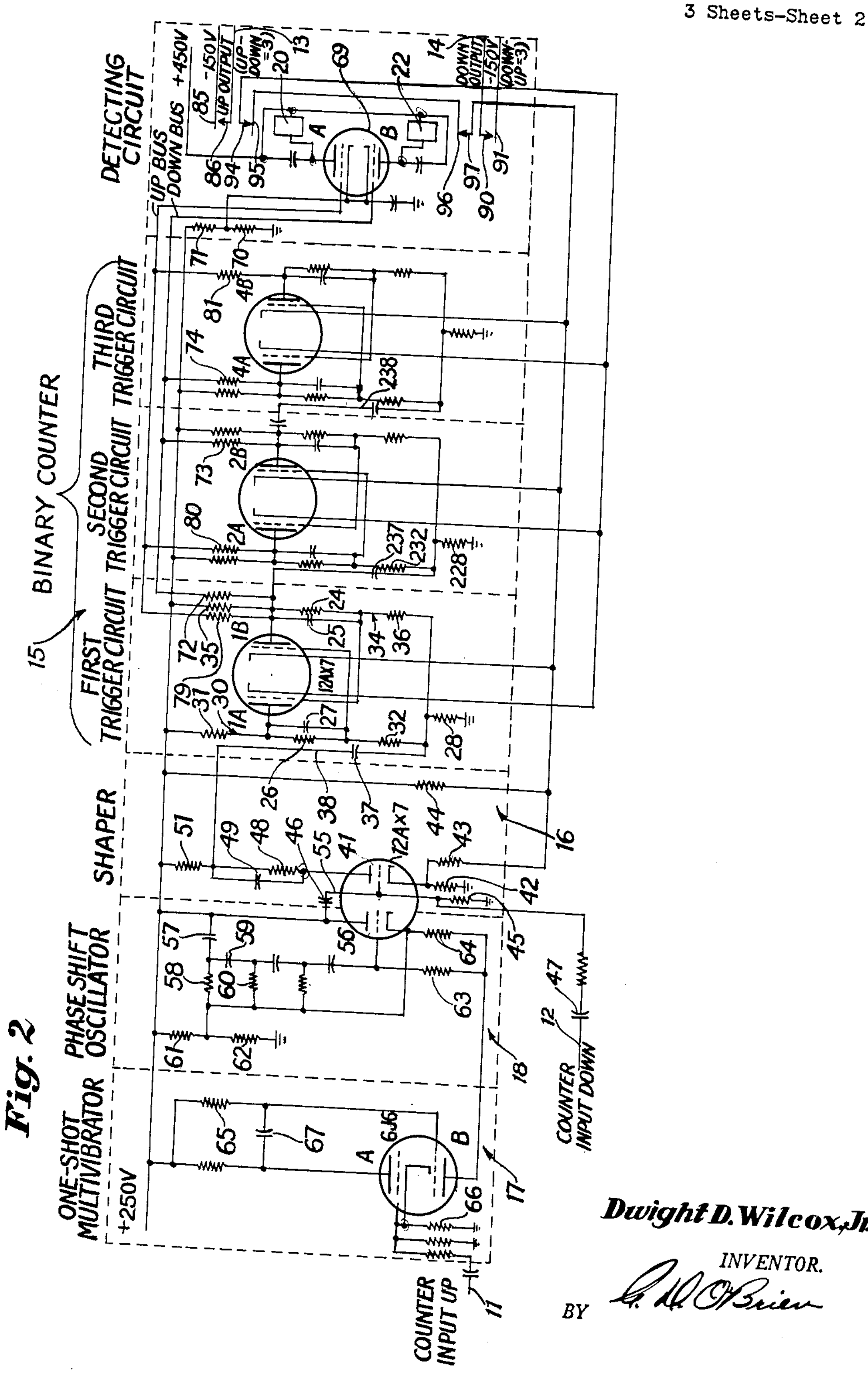
Fig. 2 illustrates schematically one form of electric circuit which can be utilized to provide the embodiment of Fig. 1.

The schematic circuit diagram of Fig. 2 will first be described with reference to the binary counter 15 which is adapted to provide summation of the input pulses over the channels 11 and 12. The binary counter of the preferred embodiment of the invention includes three stages of triggering circuits respectively designated 1, 2 and 4 in representation of their corresponding numerical values in the counting cycle. The stages are substantially identical and stage 1 will be detailed with the understanding that the succeeding stages differ only where specifically designated. The heart of the binary counter is a modification of the well known Eccles-Jordan, or "trigger," circuit which possesses two conditions of stable equilibrium. Such a circuit with two stable states is conventionally termed "bistable," i. e., two triggers are required to put the circuit through one complete cycle. In one simpler form this trigger circuit includes two triodes in which the grid of the first triode 1A is coupled to the anode of the second triode 1B through a network comprising a parallel connected resistor 24 and capacitor 25, and the grid of the second triode 1B is similarly coupled to the anode of the first triode 1A through a similar coupling network comprising a parallel connected resistor 26 and capacitor 27. A resistor 28 having one side thereof connected to electrical ground is common to a voltage dividing network 30 associated with the triode 1A including two resistances 31 and 32 in series with the resistance 26 and to a voltage dividing network 34 associated with triode 1B including two resistances 35 and 36 in series with the resistance 24. The 250 volt positive anode supply is connected to the plates of the triodes 1A and 1B through the resistances 31 and 35 respectively. Pulses coupled to the first stage through a condenser 37 are impressed across the common resistor 28 to trigger the first stage. The triode which is cut off has a high anode potential and maintains the grid of the other triode in the conducting region; similarly, the anode voltage of the conducting tube is low and maintains the grid of the cut-off tube in the non-conducting region. One triode may be cut off in preference to the other by applying trigger impulses to the proper places in the circuit or by opening the cathode circuit of the conducting triode. Such a two-tube regenerative circuit which can exist in either of two stable states and can change rapidly from one state to another by pulses applied so as to cause the sudden shift in operating state at predetermined times is conventionally termed a "synchronized multivibrator" and is one version of a trigger circuit. When such a multivibrator requires only one trigger to complete an entire cycle it is termed "monostable"; when two triggers are required to perform a complete cycle it is "bistable." Other well known flip-flop circuits utilize saturable reactors or three-electrode semiconductor amplifiers termed "transistors," and the appended claims are intended to cover all such circuits.

In the preferred embodiment of the invention, the two triodes of the trigger circuit are contained within a single envelope such as a twin triode type 12AX7 tube. The trigger circuits of the binary counter are connected in cascade so that each stage, or pair of trigger triodes, receives its operating impulse from the trigger circuit immediately preceding it. The resistor 28 common to both triodes 1A and 1B of the first trigger circuit permits both triodes 1A and 1B to be triggered from a common source. In order to analyze the operation of the first trigger circuit, assume that triode 1A is cut off and that triode 1B is conducting. A negative impulse of sufficient amplitude over the lead 38 from the shaper 16 is impressed across the resistance 28 and onto the grids of the triodes 1A and 1B through resistances 36 and 32 respectively. Since the grid of the cut-off triode 1A is already at low potential, triode 1A is unaffected. The grid of the triode 1B is driven sufficiently negative so that triode 1B is cut off by the impulse. Momentary biasing of the grid of triode 1B beyond cut off stops the flow of current through the triode 1B and a corresponding rise in its plate voltage occurs. This increase in plate voltage is impressed on the grid of triode 1A through condenser 25, and as the voltage across the capacitor cannot be changed instantaneously, the voltage of the grid of triode 1A rises into the conducting region and the potential of the anode of triode 1A correspondingly falls. This decrease in plate potential of triode 1A is passed to the grid of triode 1B through condenser 27, causing a still further decrease in the plate current through triode 1B. This action continues until triode 1B is conducting a heavy current and triode 1A is cut off. The reversing or "flopping" from one state of equilibrium to the other occurs so rapidly as to be almost instantaneous. Thus a reversal is accomplished of the conditions found existing before the initiating trigger pulse is impressed across the resistor 28. The output of the first trigger circuit is connected from the anode of triode 1B through coupling capacitor 237 to the second trigger circuit. During this reversing from one state of equilibrium to the other, the anode of the triode 1B rises rapidly in potential, impressing a sharp positive impulse across the resistor 228 of the second stage of the binary counter 15, i. e., across the second trigger circuit. However, the trigger circuits of the binary counter are responsive to negative impulses only and do not react to positive pulses. This insensibility to positive pulses is accomplished by choosing circuit constants which require that a greater voltage pulse be utilized to drive the grid potential of a cut-off tube into the conducting region than is required to drive the grid of a conducting tube below cutoff. The values of the resistances of the voltage dividing networks 30 and 34 are selected so that the grid of a conducting triode is maintained only slightly more positive than cut-off voltage while the grid of a cut-off triode is maintained relatively further from cut-off voltage. When a positive pulse through condenser 37 is impressed across resistance 28, the positive voltage is supplied similarly to the grids of both triodes of the stage. The grid of the conducting triode, e. g., 1A, being already positive draws grid current thus holding down the potential rise, and the positive potential applied to the grid of triode 1B is insufficient to drive it above cut off. The more positive of the grids of the triodes 1A and 1B dissipates more of the energy of a positive pulse so that the voltage rise in the grid of the other triode is less than if both grids were at high impedance. However, when a negative pulse is impressed across resistor 28, no grid current flows in the grid circuit of either triode 1A or 1B, and the negative pulse momentarily biases the grid of triode 1B beyond cutoff. Thus the positive impulse impressed across the resistance 228 does not trigger the second trigger circuit.

Tube 1A continues to conduct heavily until a second negative trigger impulse over the lead 38 is impressed across the resistor 28 of the first trigger circuit to again accomplish a reversal of operating conditions. This second negative trigger acts on conducting tube 1A causing a sudden decrease in plate current and a corresponding rise in plate voltage. This rise is passed to the cut-off tube 1B resulting in a flow of current in the anode circuit. As triode 1B begins to conduct, the voltage of its plate decreases, delivering a negative pulse through condenser 237 over the lead 238 of sufficient amplitude to actuate the second trigger circuit. At this time the first trigger circuit of the binary counter has been triggered twice and has returned to its original state, but the second trigger circuit has been actuated only once and is thus reversed from its original position. A third negative pulse over the lead 38 again causes a reversal or "flopping" of the first trigger circuit from one state of equilibrium to the other, but the positive output pulse over the lead 238 as triode 1B of the first trigger circuit goes from the conducting to the cut-off condition fails to actuate the second trigger circuit as hereinbefore explained. Similarly, each succeeding stage will be triggered just half as many times as the stage immediately preceding it, and the number of unique positions which the chain may assume is two to the power of the number of stages, i. e., with four stages, $2^4$ power=16, 16 is the capacity of the counter.

The binary counter chain of the preferred embodiment of the invention consists of three identical stages of twin triodes connected in cascade relation or a total of six triodes with six plates. Thus there are $2^3$ power—8 unique positions determined by the six plates, i. e., the binary counter has a capacity of 8. Numbering the triodes 1A, 1B, 2A, 2B, 4A, and 4B, the eight positions are as shown in Table 1 where the B triodes trigger the following stage when they go from cut off to conducting.

*Table 1*

| Counter Position | First Trigger Circuit | | Second Trigger Circuit | | Third Trigger Circuit | |
|---|---|---|---|---|---|---|
| | 1A | 1B | 2A | 2B | 4A | 4B |
| 0 | X | O | X | O | X | O |
| 1 | O | X | X | O | X | O |
| 2 | X | O | O | X | X | O |
| 3 | O | X | O | X | X | O |
| 4 | X | O | X | O | O | X |
| 5 | O | X | X | O | O | X |
| 6 | X | O | O | X | O | X |
| 7 | O | X | O | X | O | X |
| 8 | X | O | X | O | X | O |

The symbol "O" signifies that the triode is conducting: symbol "X" signifies that the corresponding triode is cut off. It will be noted that the counter position 8 is exactly the same as counter position 0, and that an additional trigger after the 8th will return the triodes to exactly the same condition as that shown in counter position 1. Thus the binary counter completes its count on the 8th trigger, and thereafter merely repeats what it has done before. Thus the counter can be completely cleared by adding in enough pulses to cause the counter to count up to 8, which is the equivalent of resetting it to 0.

Each trigger circuit of the binary counter chain is triggered by the stage immediately preceding it. The first trigger circuit is activated by a shaper circuit 16 which delivers sharp negative spikes of high amplitude and discriminates against positive output pulses. In the preferred embodiment of the invention the triode 41 of the shaper is one-half of a twin triode 12AX7, the other triode of which is utilized as the phase-shift oscillator 18. The cathode of the triode 41 is normally maintained 10 volts positive with respect to ground by a connection to the junction of two resistors 42 and 43 which, in series with a resistor 44, comprise a voltage dividing network connected between the 250 volt anode supply and ground. The triode 41 is normally cut off since its grid is connected to ground through the resistance 45. The triode 41 conducts whenever a steep positive voltage front is impressed on the grid through either of the coupling condensers 46 or 47. The plate circuit of the triode 41 includes a paralleled resistance 48 and capacitance 49 in series with a resistor 51 to the 250 volt anode supply, and the output from the shaper circuit 16 is taken from the junction of the two resistances 48 and 51 over the lead 38 through condenser 37 to the first trigger circuit. The resistance 48 is effectively short-circuited by the condenser 49 when the triode 41 begins to conduct, with the result that a large negative "spike" impulse appears in the output of the shaper circuit as the anode of the triode 41 decreases in voltage. This negative "spike" impulse is connected over the lead 38 through the capacitance 37 and is impressed across the resistor 28 to activate the first trigger circuit. The negative voltage of the output pulse quickly decreases as the capacitance 49 charges, and when the initiating pulse is removed from the grid of the triode 41, the resulting positive pulse delivered over the lead 38 as the plate is driven positive is considerably smaller in amplitude than the negative spike pulse. As explained hereinbefore, the trigger circuits of the binary counter 15 are only responsive to negative triggers and are not activated by positive pulses impressed across the resistor 28.

It will be noted from Table 1 that when seven pulses are added into the counter, the system reaches equilibrium back one number from that from which it started. Thus, if the system is at 1 and is pulsed seven times more, it ends up at 8 or 0; if seven impulses are impressed on the grid of the triode 41 when the system is at counter position 7, the counter ends up at position 6. This principle of adding into the system a number of pulses, one less than the capacity of the counter, is utilized in the differential computer of the invention to accomplish progressive subtraction, i. e., to cause the binary counter to count in a reverse direction. Since the end result of the electronic computer of the invention is to compute differentials, one of the inputs, e. g., Up, causes the counter to count forward seven positions, or back one count, while the second counter input, e. g., Down, causes the counter to count forward one position. Pulses applied alternately over the input channels 11 and 12 in effect cause the counter to remain stationary. Since the total of the two successive pulses is always 8, the counter always returns to its original position. If more pulses are coming over one input than the other, the count will proceed in the forward or the reverse direction from 0, depending upon whether the most impulses come over The Up input 11 or the Down input 12.

Changing the one pulse from the Up channel into a plurality of pulses numbering one less than the capacity of the counter in order to make the counter subtract, i. e., count backwards, is accomplished by gating an oscillator "on" for a predetermined interval and shaping its output. The seven impulses are transmitted through the condenser 46 over the lead 55 and impressed on the grid of the triode 41 of the shaper 16 to derive negative "spike" pulses for triggering the binary counter in the manner hereinbefore described. A conventional four section phase-shift oscillator 18 operating at approximately 800 cycles per second consists of a single amplifier triode 56 (which is one half of the 12AX7 twin triodes containing the triode 41) plus a phase-shifting feedback circuit including four resistance-capacitance L-sections. The output from the plate of the oscillator tube 56 is impressed across the first resistance-capacitance L-section consisting of a capacitance 57 and a resistance 58. The voltage drop across the resistance 58 leads the output from the plate of the tube 56 (impressed across the first L-section) and is impressed across the second RC L-section consisting of a capacitance 59 and a resistance 60 in order to obtain a shift in phase. In a similar manner each RC section produces a desired phase shift, and circuit constants are chosen to bring the total phase shift to 180° at only one frequency, or in phase with the grid of the oscillator tube 56. From grid to plate of the tube 56, 180° phase inversion is accomplished. This 180° phase shift is thus fed back through the four RC L-sections for another 180° shift to maintain the oscillations. The cathode of the triode 56 is maintained at approximately 90 volts positive with respect to ground by a connection to the junction of two resistances 61 and 62 connected in series to form a voltage dividing network between the anode supply and ground.

The gating of the phase-shift oscillator 18 is accurately controlled by a one-shot, or monostable, multivibrator 17 designed to give pulses of uniform time and duration. The one-shot multivibrator 17 accomplishes a complete cycle when triggered by a positive pulse and is essentially a two stage resistance-capacitance-coupled amplifier with one tube cut off and the other normally conducting. Triode B of a twin triode type 6J6 tube normally conducts heavily because its grid is connected directly to the 250 volt anode supply through a resistance 65. The anode of the triode B of the monostable multivibrator is connected through the resistance 64 to the cathode of the triode 56 of the phase-shift oscillator, which cathode is normally maintained at 90 volts positive with respect to ground. The voltage drop across this resistance 64 in the plate circuit of the triode B of the multivibrator is large and of such polarity as to maintain the grid of the triode 56 of the oscillator beyond cut off. Triode A of the monostable multivibrator 17 is initially cut off by the flow of current through the cathode resistor 66 which maintains the cathode at a voltage positive with respect to the grid. When a positive pulse is received over the Up counter input lead 11 of sufficient amplitude to raise the grid of triode A above the cut off voltage, triode A begins to conduct and the voltage at its plate decreases. This decrease passes through a condenser 67 connected between the anode of triode A and the grid of triode B, and as the voltage across the capacitor cannot be changed instantaneously, it appears on the grid of triode B of the one-shot multivibrator 17 as a negative-going voltage which decreases the plate current of triode B and in turn decreases the voltage drop across the cathode resistance 66. The reduction of the voltage drop across the cathode resistor 66 allows more current to flow in triode A, thereby decreasing the plate voltage further and driving the grid of triode B more negative until triode B is cut off and triode A is conducting. When triode B is cut off, the voltage drop across the plate resistor 64 falls to zero and removes the bias on the grid of the triode 56. The triode 56 begins to oscillate and continues to do so until the voltage drop again appears across resistor 64. The output pulses from the phase-shift oscillator 18 are impressed over the lead 55 through the capacitance 46 directly to the grid of the triode 41 of the shaper 16. The phase-shift oscillator 18 will continue to oscillate until triode B again conducts sufficiently for the flow of plate current through the resistor 64 to bias the triode 56 beyond cut off. Triode B of the one-shot multivibrator 17 begins to conduct as soon as its grid rises from its lowest value to cut off voltage. This will occur as soon as condenser 67 can be charged sufficiently through resistance 65 to allow the grid of triode B to rise to cut off voltage. The time delay required for this is measured by the time constant of the capacitance 67 and the resistor 65. At the end of this time interval (which determines the length of time that the phase-shift oscillator 18 is gated) triode A is again cut off by the bias voltage caused by the flow of cathode current through the resistor 66 and through the triode B, to return the monostable multivibrator 17 to its original equilibrium position. In the preferred embodiment of the invention, a resistance 65 of 2.4 megohms is used with a capacitance 67 of 0.01 microfarad to accomplish the desired timing, and it has been found that adjustment of the timing of the one-shot multivibrator 17 is best accomplished by changing the value of the resistance 65.

In operation, the binary counter 15 of the invention counts forward on Down impulses and counts backward on Up impulses i. e., forward seven impulses. Incoming pulses over the Down input channel 12 drive the triode 41 of the shaper 16 directly to cause the binary counter 15 to count forward. Incoming pulses over the Up input channel 11 trigger the one-shot multivibrator 17 which gates the oscillator 18 for a number of pulses numbering one less than the capacity of the system. The seven pulses then drive the shaper 16 including the triode 41 to actuate the first trigger circuit of the binary counter. In this manner the circuit of the preferred embodiment of the invention computes differentials as desired, by counting forward on Down impulses and counting in the reverse direction on Up impulses. Counting circuits utilizing neon or crystal diodes are well known, and the appended claims are intended to cover such modifications.

In one application of the electronic differential computer of the invention, it is desirable that an output signal be given when a differential of 3 is accumulated, i. e., when a difference in the number of pulses coming in over the Up and Down input channels has reached 3 (Up—Down =3 or Down—Up=3). This is accomplished by providing means to detect when counter positions 3 and 5 (—3) are reached. It will be noted from Table 1 that at counter position 3, the triodes 1B, 2B, and 4A are cut off, and that at position 5 the triodes 1B, 2A and 4B are cut off, and that these positions are uniquely determined by the combination of the three applicable triodes. In the preferred embodiment of the invention the anodes of the three cut-off triodes at counter positions 3 and 5 (—3) are utilized to cause vacuum tubes to conduct and in turn operate relays to give the desired output pulse. To facilitate the understanding of the invention, the means for detecting when a differential of 3 is accumulated is illustrated schematically in Fig. 3 and in detail in Fig. 2. Triode A consisting of one half of a twin triode 6J6 tube 69 is utilized for detecting when counter position 5 (—3) is reached; triode B consisting of the opposite half of the same 6J6 twin triode 69 detects when the binary counter has counted forward to position 3. The cathode of the detecting tube 69 is normally maintained 215 volts positive with respect to ground by a connection to the junction of two resistances 70 and 71 connected in series as a voltage divider between the 250-volt plate supply and ground (see Fig. 2). The anode of each triode 1A, 1B, 2A, 2B, 4A, and 4B of the trigger circuits of the binary counter 15 is also at 215 volts positive with respect to ground when each triode is cut off. The grid of triode B of the detecting tube 69 is connected to a Down bus which is commoned to the plates of triodes 1B, 2B, and 4A through resistances 72, 73 and 74 respectively. Triode B of the detecting tube 69 can conduct when, and only when, the triodes 1B, 2B, and 4A are cut off, i. e., at counter position 3. When triodes 1B, 2B and 4A are cut off, the anodes of these three triodes are all 215 volts positive with respect to ground, the Down bus is at +215 volts, and no negative bias voltage will be maintained on the grid to keep the triode B in the nonconducting condition. A potential supply of 450 volts positive with respect to ground is connected through the coil of the Down relay 22 to the anode of the triode B of the detecting tube 69, and triode B of the detecting tube 69 conducts heavily to operate the Down relay 22. In a similar manner the grid of triode A of the detecting tube 69 is connected to an Up bus which is commoned to the anode electrodes of triodes 1B, 2A, and 4B of the trigger circuits of the binary counter 15 through resistances 79, 80 and 81 respectively. At counter position 5(—3) the triodes 1B, 2A, and 4B are cut off, the anodes of these three triodes are at +215 volts, the difference in potential between the cathode and the grid of triode A of the detecting tube 69 is zero, and triode A conducts heavily to operate the Up relay 20.

It will be apparent from Table 1 that if the position of the binary counter is neither 3 nor 5 (—3), neither triode A nor triode B of the detecting tube 69 can conduct. For example, at counter position 1 the triodes 1B, 2A and 4A of the trigger circuits of the binary counter are cut off, and triodes 1A, 2B, and 4B are conducting. The anodes of the cut-off triodes 1B and 4A are at 215 volts while the anodes of the conducting triode 2B is at 155 volts, and the plate resistors 72, 73, and 74 form a voltage dividing network as schematically illustrated in Fig. 4 to maintain the Down bus (and thus the grid of triode B of the detecting tube 69) at a potential of 195 volts. The grid of triode B of tube 69 is thus maintained 20 volts negative with respect to the cathode which in turn is maintained 215 volts positive with respect to ground. The grid of triode B of the detecting tube 69 is thus maintained below cut off at counter position 1 to prevent operation of the Down relay 22. In a similar manner at counter position 1, the anodes of the cut-off triodes 1B and 2A are at 215 volts positive with respect to ground while the anode of the conducting triode 4B is maintained at 155 volts positive with respect to ground. As shown schematically in Fig. 5, the resistors 79, 80 and 81 in the plate circuits of these triodes form a voltage dividing network which maintains the Up bus (and thus the grid of the triode A of the detecting tube 69) at 195 volts positive with respect to ground. The grid of triode A is thus biased below cut off to prevent operation of the Up relay 20 at binary counter position 1. In a similar manner both triode A and triode B of the detecting tube 69 are prevented from conducting if the binary counter 15 is at any position except 3 or 5 (—3). During each backward count, i. e., when seven pulses are sent into the binary counter, the computer passes through positions 3 and 5. However, the time interval during which the binary counter remains at positions 3 and 5 is considerably shorter than the time period required for operation of the Down relay 22 or the Up relay 20, and consequently no output pulses are sent. When the binary counter comes to rest at either position 3 or position 5 (—3), the corresponding triode of the detecting tube 69 is caused to conduct and operate a relay in its plate circuit as hereinbefore described.

The Up relay 20 and the Down relay 22 are both provided with a pair of normally open and a pair of normally closed contacts. The normally open contacts 85 and 86 of the Up relay 20 connect a 150 volt negative pulse over the counter output Up channel 13 when the Up relay 20 is operated. Similarly, normally open contacts 90 and 91 on the Down relay 22 connect a 150 volt negative pulse over the counter output Down channel 14 when the Down relay 22 is operated. The normally closed contacts 94 and 95 on the Up relay 20 and the normally closed contacts 96 and 97 on the Down relay 22 are utilized to reset the binary counter to position 0 so that it may immediately start computing differentials again. As can be seen from Fig. 2, operation of the Down relay 22 opens the normally closed contacts 96 and 97 to open the cathode circuit of the triodes 1A, 2A and 4A of the binary counter; in a similar manner, operation of the Up relay 20 opens the normally closed contacts 94 and 95 to open the cathode circuits of the triodes 1A, 2A, and 4A of the binary counter. Opening the cathode circuits of the triodes 1A, 2A, and 4A cuts off these triodes and causes the triodes 1B, 2B, and 4B to become conducting in the manner hereinbefore described. As can be seen from Table 1, the binary counter 15 is reset to position 0 when the triodes 1B, 2B and 4B are conducting, and the electronic differential computer of the invention is again ready to compute the difference in the number of impulses received over the input channels 11 and 12.

Having thus described my invention, I claim:

1. An electronic, digital, sequence-operated computer for providing a summation of the pulses over two input channels comprising a binary counter having a plurality of cascaded trigger circuits, each adapted to be triggered only once for each complete cycle of two triggers of the preceding trigger circuit, a first input channel, a second input channel, an oscillator normally biased so that the feedback voltage is insufficient to sustain oscillation, a monostable multivibrator coupled to said oscillator and to said second input channel and responsive to a pulse over said second input channel for removing the bias on said oscillator for a sufficient time to generate $(2^n-1)$ pulses, where $n$ is the number of said trigger circuits, and a shaper circuit coupled to the first of said trigger circuits, to said first input channel and to said oscillator and responsive to a pulse over said first input channel for triggering the first of said triggered circuits once for each pulse over said first input channel whereby said counter counts forward and to the pulses generated by said oscillator for triggering the first of said trigger circuits $(2^n-1)$ times for each pulse over said second channel, the summation being determined by the channel providing the most pulses.

2. An electronic, digital, sequence-operated computer for providing a summation of the pulses over two input channels comprising a binary counter having a plurality of cascaded trigger circuits, each adapted to be triggered only once for each complete cycle of two triggers of the preceding trigger circuit, a first input channel, a second input channel, an oscillator normally biased so that the feed back voltage is insufficient to sustain oscillation, a monostable multivibrator coupled to said oscillator and to said second input channel and responsive to a pulse over said second input channel for removing the bias on said oscillator for a sufficient time to generate $(2^n-1)$ pulses, where $n$ is the number of said trigger circuits, a shaper circuit coupled to the first of said trigger circuits, to said first input channel and to said oscillator and responsive to a pulse over said first input channel for triggering the first of said trigger circuits once for each pulse over said first input channel whereby said counter counts forward and to the pulses generated by said oscillator for triggering the first of said trigger circuits $(2^n-1)$ times for each pulse over said second channel, the summation being determined by the channel providing the most pulses, and means responsive to said trigger circuits for detecting when said counter reaches any predetermined number within its range.

3. An electronic, digital, sequence-operated computer for providing a summation of the pulses over two input channels comprising a binary counter having a plurality of cascaded trigger circuits, each adapted to be triggered only once for each complete cycle of two triggers of the preceding trigger circuit, a first input channel, a second input channel, an oscillator normally biased so that the feed back voltage is insufficient to sustain oscillation, a monostable multivibrator coupled to said oscillator and to said second input channel and responsive to a pulse over said second input channel for removing the bias on said oscillator for a sufficient time to generate $(2^n-1)$ pulses, where $n$ is the number of said trigger circuits, a shaper circuit coupled to the first of said trigger circuits, to said first input channel and to said oscillator and responsive to a pulse over said first input channel for triggering the first of said trigger circuits once for each pulse over said first input channel whereby said counter counts forward and to the pulses generated by said oscillator for triggering the first of said trigger circuits $(2^n-1)$ times for each pulse over said second channel, the summation being determined by the channel providing the most pulses, means responsive to said trigger circuits for detecting when said counter reaches any predetermined number within its range, and means responsive to said detecting means for delivering a pulse over an output channel when said counter reaches the predetermined number.

4. An electronic, digital, sequence-operated computer for providing a summation of the pulses over two input channels comprising a binary counter having a plurality of cascaded trigger circuits, each adapted to be triggered only once for each complete cycle of two triggers of the preceding trigger circuit, a first input channel, a second input channel, an oscillator normally biased so that the feed back voltage is insufficient to sustain oscillation, a monostable multivibrator coupled to said oscillator and to said second input channel and responsive to a pulse over said second input channel for removing the bias on said oscillator for a sufficient time to generate $(2^n-1)$ pulses, where $n$ is the number of said trigger circuits, a shaper circuit coupled to the first of said trigger circuits, to said first input channel and to said oscillator and responsive to a pulse over said first input channel for triggering the first of said trigger circuits once for each pulse over said first input channel whereby said counter counts forward and to the pulses generated by said oscillator for triggering the first of said trigger circuits $(2^n-1)$ times for each pulse over said second channel, the summation being determined by the channel providing the most pulses, means responsive to said trigger circuits for detecting when said counter reaches any predetermined number within its range, an output channel, means responsive to said detecting means for delivering a pulse over said output channel when said counter reaches said predetermined number, and means responsive to the pulse delivered over said output channel for resetting said counter to initial condition.

References Cited in the file of this patent

UNITED STATES PATENTS

| | | |
|---|---|---|
| 2,272,070 | Reeves | Feb. 3, 1942 |
| 2,514,035 | Dickinson | July 4, 1950 |
| 2,514,036 | Dickinson | July 4, 1950 |
| 2,563,841 | Jensen | Aug. 14, 1951 |
| 2,574,283 | Potter | Nov. 6, 1951 |

OTHER REFERENCES

"Reversible Decade Counting Circuit", Regener, Review of Scientific Instruments, October, 1946; volume 17, No. 10, pages 375–376.